(12) United States Patent
Wilson et al.

(10) Patent No.: US 9,746,106 B1
(45) Date of Patent: Aug. 29, 2017

(54) VEHICLE CABLE SPACERS AND METHODS

(71) Applicant: Toyota Motor Sales U.S.A., Inc., Torrance, CA (US)

(72) Inventors: Jakin C. Wilson, Torrance, CA (US); Bobby Smith, San Diego, CA (US)

(73) Assignee: Toyota Motor Sales U.S.A., Inc., Torrance, CA (US)

( * ) Notice: Subject to any disclaimer, the term of this patent is extended or adjusted under 35 U.S.C. 154(b) by 0 days.

(21) Appl. No.: 15/092,690

(22) Filed: Apr. 7, 2016

(51) Int. Cl.
| F16L 3/127 | (2006.01) |
| F16L 3/12 | (2006.01) |
| B60T 17/00 | (2006.01) |
| B60G 13/00 | (2006.01) |
| B60G 15/06 | (2006.01) |
| B60G 11/02 | (2006.01) |

(52) U.S. Cl.
CPC ............ *F16L 3/1222* (2013.01); *B60T 17/00* (2013.01); *F16L 3/127* (2013.01); *B60G 11/02* (2013.01); *B60G 13/00* (2013.01); *B60G 15/06* (2013.01); *B60G 2202/11* (2013.01); *B60G 2202/24* (2013.01); *B60G 2300/02* (2013.01)

(58) Field of Classification Search
CPC ......... F16L 3/1222; F16L 3/127; B60T 17/00; B60G 11/02; B60G 13/00; B60G 15/06; B60G 2202/11; B60G 2202/24; B60G 2300/02

See application file for complete search history.

(56) References Cited

U.S. PATENT DOCUMENTS

| 3,041,086 A | * | 6/1962 | Walker | B60G 11/46 267/2 |
| 2006/0046826 A1 | * | 3/2006 | Gilmartin | B60G 3/28 463/19 |
| 2015/0360727 A1 | * | 12/2015 | Miwa | B60K 15/01 280/124.109 |
| 2016/0339823 A1 | * | 11/2016 | Smith | B60P 1/18 |

FOREIGN PATENT DOCUMENTS

| CN | 201761485 U | 3/2011 |
| CN | 201769805 U | 3/2011 |
| CN | 201834000 U | 5/2011 |
| CN | 202753921 U | 2/2013 |
| CN | 203995543 U | 12/2014 |
| GB | 2243254 A | 10/1991 |

* cited by examiner

Primary Examiner — Faye M Fleming
(74) Attorney, Agent, or Firm — Dinsmore & Shohl LLP (57) ABSTRACT

A vehicle including a vehicle cable spacer coupled to an outboard arm of a suspension bracket and including: a body; a first face, directed toward the suspension bracket; a first anti-rotation tab extending inboard from the first face and engaging an edge of the suspension bracket; a second face spaced apart from the first face by a width of the body; and a second anti-rotation tab extending outboard from the second face; a cable cuff coupled to the second face of the vehicle cable spacer, an edge of the cable cuff engaging the second anti-rotation tab of the vehicle cable spacer; and a vehicle cable extending through the cable cuff such that the vehicle cable is spaced from the vehicle cable spacer.

20 Claims, 7 Drawing Sheets

VEHICLE CABLE SPACERS AND METHODS

TECHNICAL FIELD

The present specification generally relates to vehicle cable spacers and, more specifically, to vehicle cable spacers for spacing a vehicle cable of a vehicle away from undercarriage components, such as a shock absorber.

BACKGROUND

Vehicles generally include shock absorbers coupled to the wheels to absorb jarring caused by traveling over rough terrain. Shock absorbers may include viscous dampers or the like that resist motion of the wheels with respect to the vehicle, such that vehicle passengers may have a smoother more comfortable ride. In an off-road vehicle, the undercarriage components, such as the shock absorbers and/or reservoirs of the shock absorbers may be visible and incidental contact between a vehicle cable, such as a parking brake cable, and an undercarriage component, such as a the shock absorber, may cause unsightly damage to the finish of the undercarriage component.

Accordingly, a need exists for structures to reduce instances of contact between vehicle cables and undercarriage components of vehicles.

SUMMARY

In one embodiment, a vehicle may include a suspension member engaged with the axle of the vehicle. The suspension member has an outboard side. A suspension bracket is fixed to the suspension member and has an outboard arm. A vehicle cable spacer is coupled to the outboard arm of the suspension bracket and includes: a body; a first face, directed toward the suspension bracket; a first anti-rotation tab extending inboard from the first face and engaging an edge of the suspension bracket; a second face spaced apart from the first face by a width of the body; and a second anti-rotation tab extending outboard from the second face. A cable cuff is coupled to the second face of the vehicle cable spacer. An edge of the cable cuff engages the second anti-rotation tab of the vehicle cable spacer. A vehicle cable extends through the cable cuff such that the vehicle cable is spaced from the vehicle cable spacer.

In another embodiment, a method of routing a vehicle cable of a vehicle away from an undercarriage component of the vehicle may include attaching a vehicle cable spacer to a suspension bracket of the vehicle. The suspension bracket is attached to a suspension member of the vehicle and includes an outboard arm spaced apart from the suspension member. The vehicle cable spacer includes: a body; a first face, directed toward the suspension bracket; a first anti-rotation tab extending inboard from the first face, wherein the first anti-rotation tab of the vehicle cable spacer is aligned with an edge of suspension bracket; a second face spaced apart from the first face by a width of the body; and a second anti-rotation tab extending outboard from the second face. The method may further include attaching a cable cuff to the second face of the vehicle cable spacer. The cable cuff includes an extending portion and a cuff portion. The extending portion is aligned with the second anti-rotation tab of the vehicle cable spacer. A vehicle cable may then be routed through the cuff portion of the cable cuff, such that the vehicle cable is spaced from the vehicle cable spacer.

In yet another embodiment, a vehicle cable spacer may include a body. A first face is located at an inboard end of the body. A first anti-rotation tab extends substantially perpendicularly from the first face in a direction of a first plane. A second face is spaced apart from the first face by a width of the body. A second anti-rotation tab extending substantially perpendicularly from the second face in a direction of a second plane. The first anti-rotation tab and the second anti-rotation tab extend in substantially opposite directions and the first and second planes are substantially perpendicular to one another. A fastener receiving aperture extends at least through the first face, wherein the fastener receiving aperture is configured to align with an alignment aperture of a suspension bracket of a vehicle. The first anti-rotation tab is configured to align with an edge of the suspension bracket. The second face is configured to receive a cable cuff. The cable cuff includes an extending portion and a cuff portion, wherein the extending portion engages the second anti-rotation tab of the vehicle cable spacer.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a shock absorbing system coupled to an axle of the vehicle. The shock absorbing system may include a shock absorber and a fluid reservoir fluidly coupled to the shock absorber. A suspension member is engaged with the axle of the vehicle and has an outboard side. A suspension bracket is fixed to the suspension member and has an outboard arm. As will be described in greater detail herein, a vehicle cable spacer is coupled to the outboard arm of the suspension bracket and includes: a body; a first face, directed toward the suspension bracket; a first anti-rotation tab extending inboard from the first face and engaging an edge of the suspension bracket; a second face spaced apart from the first face by a width of the body; and a second anti-rotation tab extending outboard from the second face. A cable cuff is coupled to the second face of the vehicle cable spacer. An edge of the cable cuff is engaged with the second anti-rotation tab of the vehicle cable spacer. As will also be described in greater detail herein, a vehicle cable extends through the cable cuff such that the vehicle cable is maintained space from one or more undercarriage components, such as the shock absorbing system.

Figure 1:
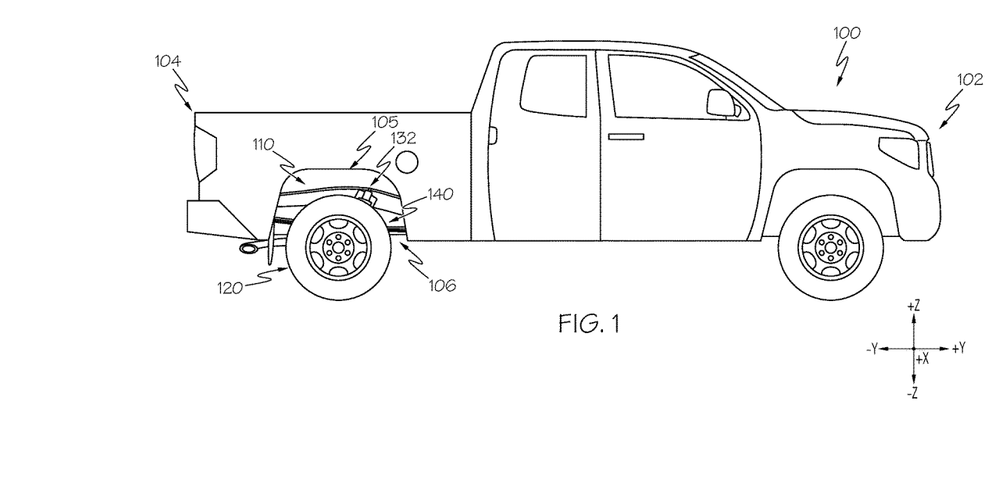
FIG. 1 depicts a side view of a vehicle according to one or more embodiments shown and described herein.

It is noted that the use of the terms "outboard" and "inboard" are directional in nature and generally refer to opposite directions transverse to the length of a vehicle, i.e. the +x and −x directions Referring now to FIG. 1, a vehicle 100 is depicted. Though a truck is shown in FIG. 1, it is contemplated that other vehicles may benefit from the present disclosure. The vehicle 100 has a front end 102 and a rear end 104. The vehicle 100 further includes a wheel well 105. Within the wheel well 105 is a wheel 120. The spacing between the wheel 120 and the wheel well 105 may be large enough to allow visibility into an undercarriage 106 of the vehicle 100. For example and as illustrated in FIG. 1, various undercarriage components of vehicle 100, such as a shock absorber 132, are visible from a distance.

Figure 2:
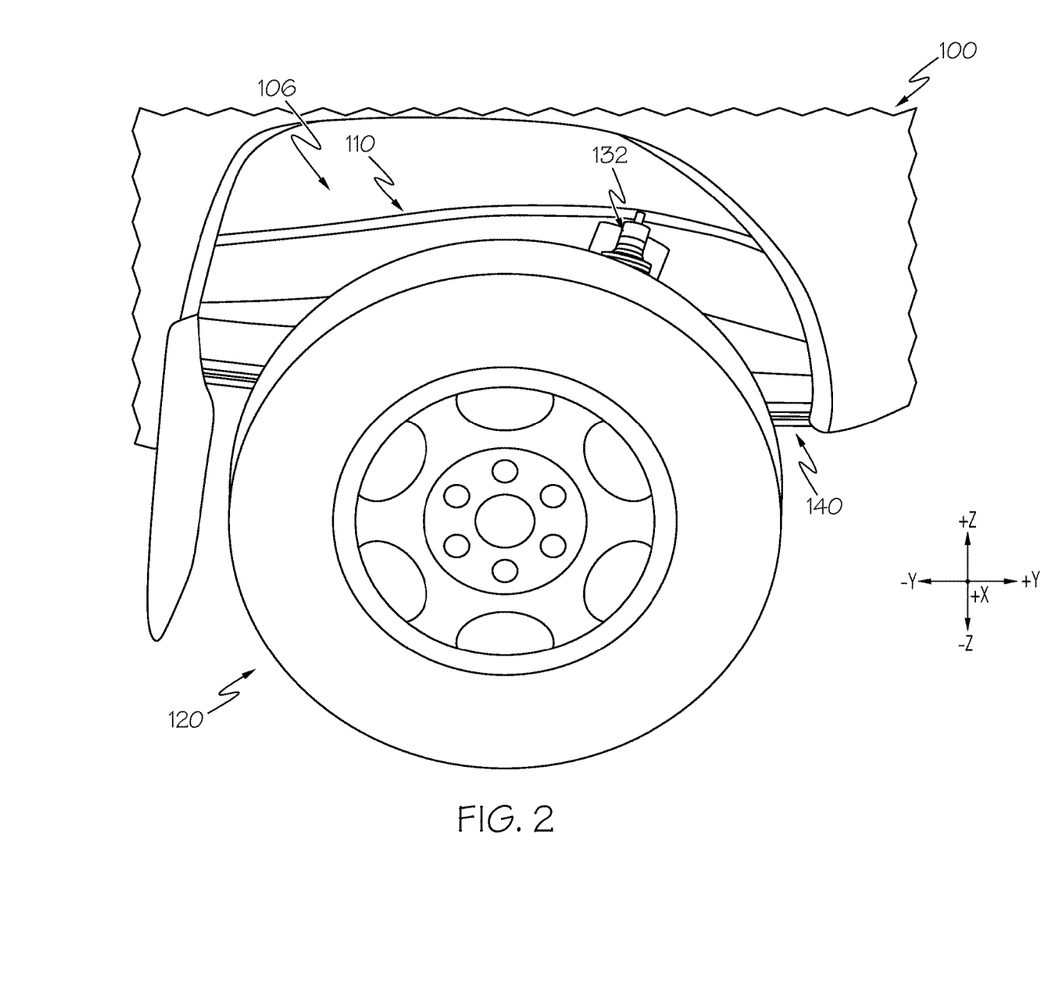
FIG. 2 depicts a detail side view of a wheel of the vehicle of FIG. 1 according to one or more embodiments shown and described herein.

FIG. 2 illustrates a more detailed, close-up view of the different undercarriage components that may (or may not) be visible through the wheel well 105 along with the shock absorber 132. For instance, FIG. 2 further depicts a frame 110 of the vehicle 100, and a suspension member 140. Other components may also be visible through the wheel well 105. For instance, some vehicles within the scope of the present disclosure may be lifted such that all undercarriage 106 components may be visible through the wheel well 105 from a distance.

Figure 3:
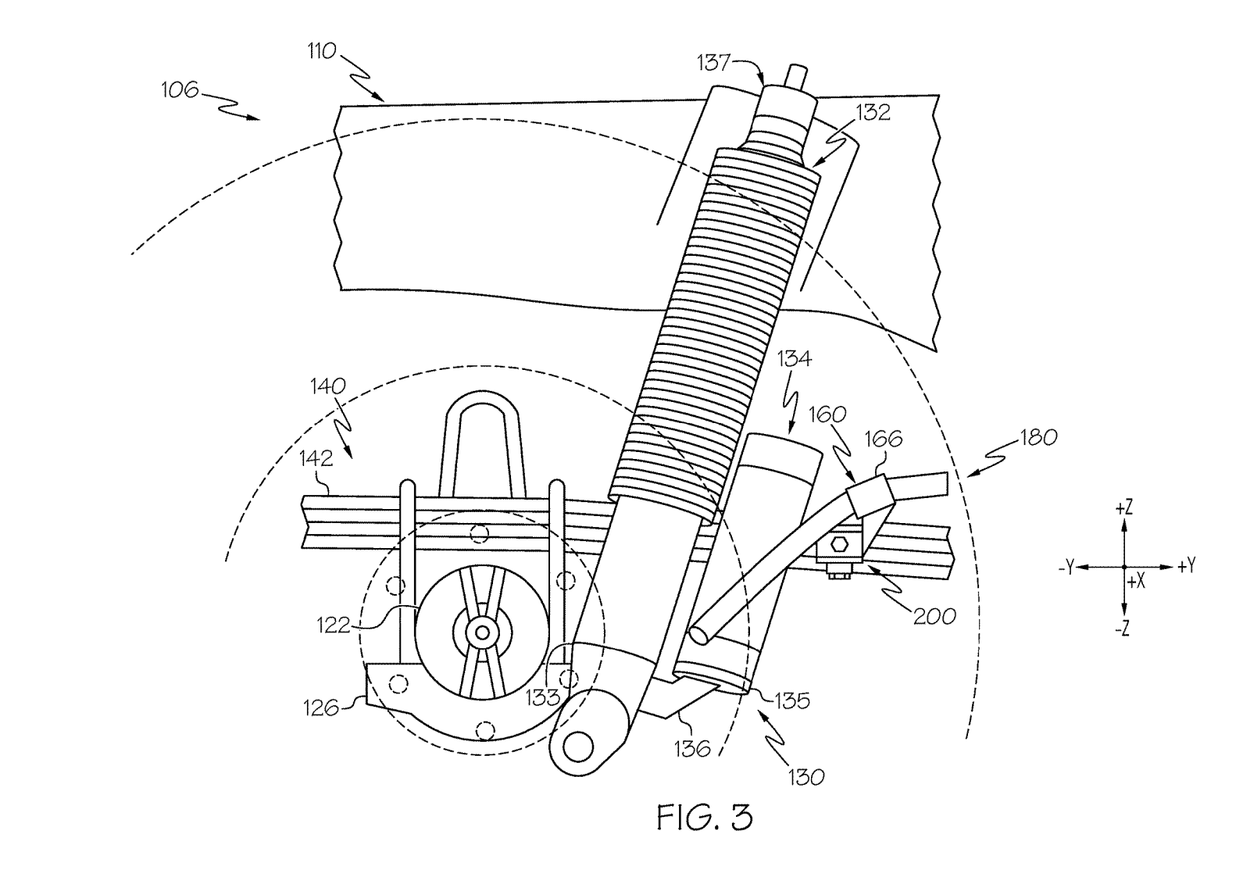
FIG. 3 depicts a schematic side view of the undercarriage components of the vehicle of FIG. 1 according to one or more embodiments shown and described herein.
Figure 4:
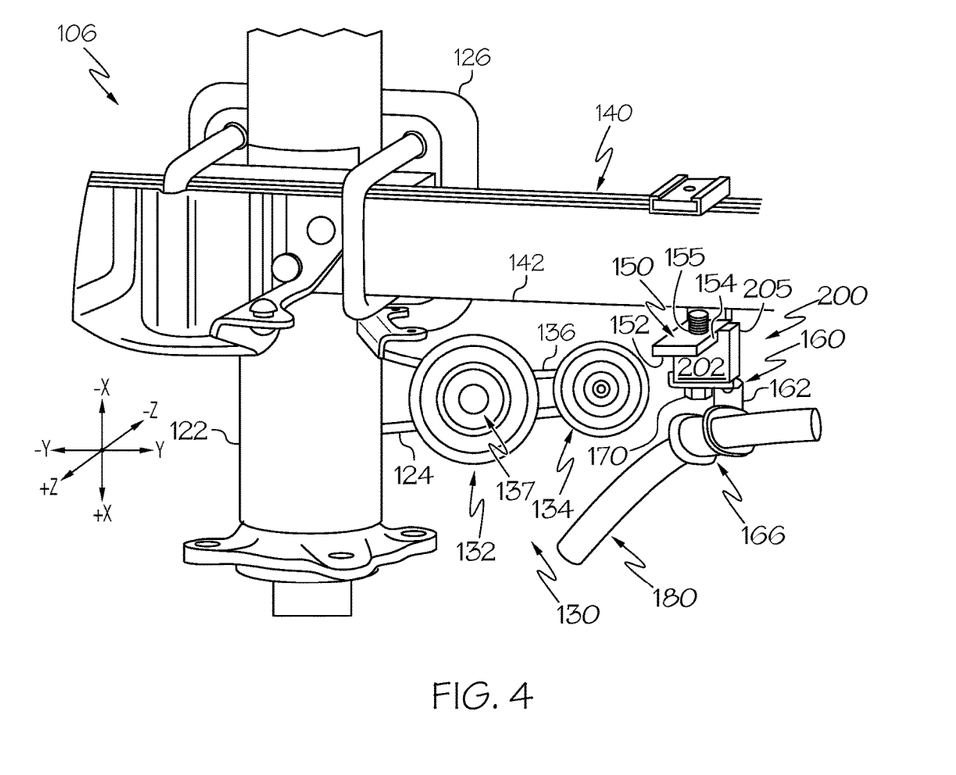
FIG. 4 depicts a schematic view of the undercarriage components of the vehicle of FIG. 1 orthogonal to an axis of a shock absorber according to one or more embodiments shown and described herein.

FIG. 3 depicts a side view of the undercarriage 106 of the vehicle 100 with the wheel 120 of the vehicle 100 shown in phantom for clarity. An axle 122 of the vehicle 100 is now visible and extends transversely through the undercarriage 106 of the vehicle 100 (as shown in FIG. 4). A shock absorbing system 130 is coupled to the axle 122 of the vehicle 100.

The shock absorbing system 130 includes at least one shock absorber 132 and may include at least one fluid reservoir 134 fluidly coupled to the shock absorber 132. The shock absorber 132 is coupled at the distal end 137 to the frame 110. There are a variety of shock absorbers available for vehicular applications. For example, and not as a limitation, the shock absorber 132 may be a coil spring, a hydraulic cylinder, a pneumatic cylinder, or a combination thereof. The shock absorbing system 130 may be configured in a variety of ways. For instance, in the exemplary embodiment depicted in FIG. 3, the shock absorbing system 130 is positioned in a direction forward of the axle 122 in a +y direction. The +y direction being indicative of a direction toward the front 102 of the vehicle 100 (as shown in FIG. 1). Furthermore, the shock absorbing system 130, or components thereof, may be tilted off of a vertical axis, z, toward the front 102 of the vehicle 100. As shown, the fluid reservoir 134 of the shock absorbing system 130 is placed forward (in the +y direction) of the shock absorber 132. In other embodiments, the shock absorber 132 may be placed forward of the fluid reservoir 134.

The shock absorbing system 130, and components thereof, may be supported in a variety of ways. Referring to FIG. 4, a branch 124 may extend from the axle 122 to support the shock absorbing system 130. The branch 124 may in some embodiments support both the shock absorber 132 and the fluid reservoir 134. In other embodiments, the shock absorber 132 is supported by the branch 124, while the fluid reservoir 134 is supported using substantially different means. In one non-limiting example, and as illustrated in FIGS. 3 and 4, an arm 136 may extend from a base 133 of the shock absorber 132 to a base 135 of the fluid reservoir 134 such that the base 133 of the shock absorber 132 and the base 135 of the fluid reservoir 134 are substantially level. In other non-limiting embodiments, the fluid reservoir 134 may be fixed to the frame 110, as shown in FIG. 3, adjacent to a distal end 137 of the shock absorber 132. In still further non-limiting embodiments, the fluid reservoir 134 may be tied to the side of the shock absorber 132.

Referring again to FIG. 3, a suspension member 140 is engaged with the axle 122, also shown in FIG. 4. Though not shown in the figures, the suspension member 140 may further be fixed to the frame 110. The suspension member 140 may curve toward the frame 110 and provide additional damping along with the shock absorbing system 130 when the vehicle 100 travels over rough terrain. In some embodiments, the suspension member 140 is a leaf spring. The suspension member 140 may be engaged to the axle 122 of the vehicle 100 using a suspension carrier 126. In some embodiments, the suspension member 140 may engage the axle 122 of the vehicle 100 such that the suspension member 140 sits above axle 122. In yet other embodiments, the axle 122 of the vehicle 100 may sit on top of the suspension member 140.

Figure 5:
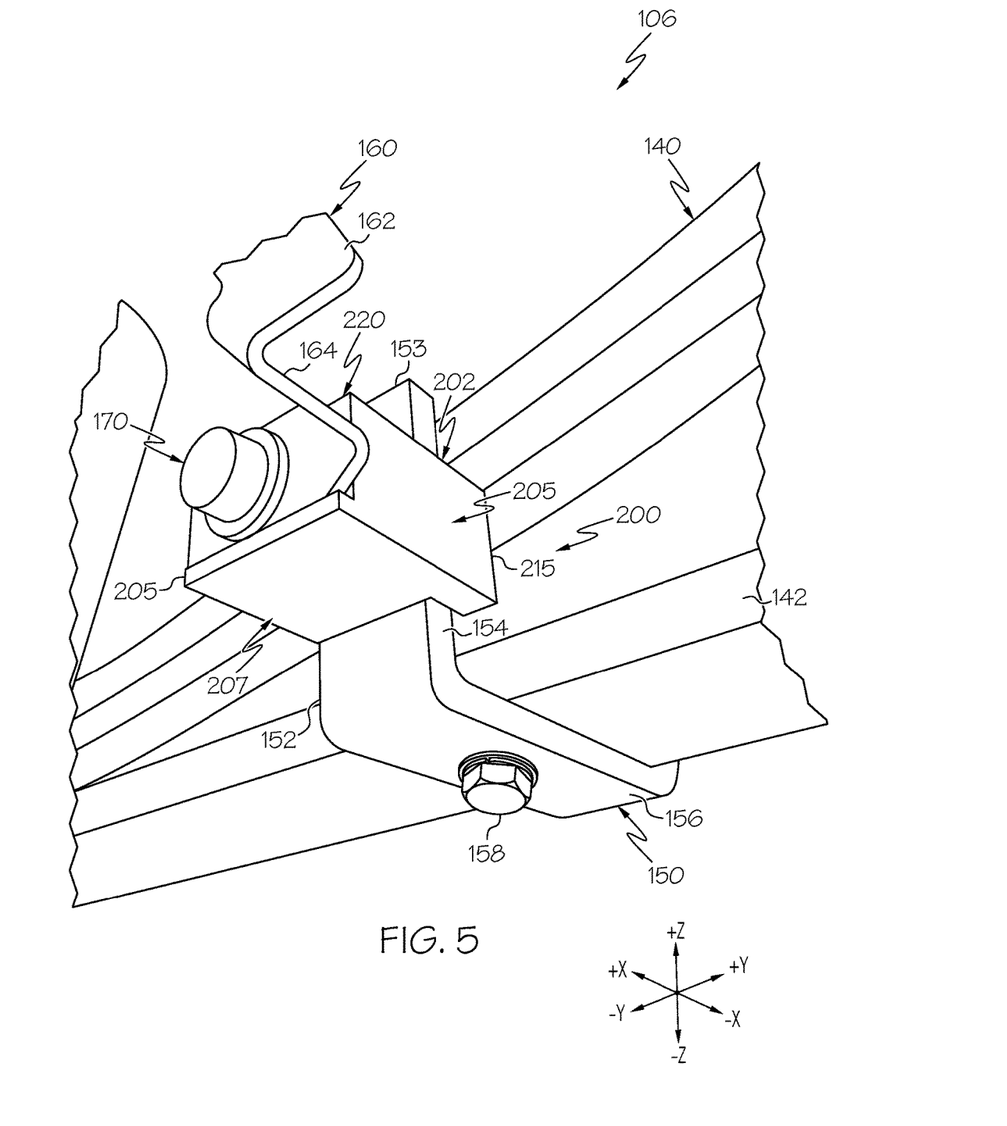
FIG. 5 depicts a bottom perspective view of a vehicle cable spacer coupled to a suspension member of the vehicle of FIG. 1 according to one or more embodiments shown and described herein.

Referring now to FIG. 5, coupled to the suspension member 140 is a suspension bracket 150 (also shown in FIG. 4). The suspension bracket 150 may surround the suspension member 140 on at least two sides. In such embodiments, the suspension bracket 150 has an outboard arm 152 extending adjacent to an outboard side 142 of the suspension member 140 and an underside portion 156. As shown, the underside portion 156 is coupled to the suspension member 140 through a suspension fastener 158 inserted therethrough. The suspension fastener 158 may extend at least partially through the suspension member 140. In other embodiments, the underside portion 156 of the suspension bracket 150 may be fixed to suspension member 140 through other suitable processes such as, but not limited to, welding. The outboard arm 152 of the suspension bracket 150 has an outboard surface 153 and an edge 154 extending along the outboard surface 153. In some embodiments, the outboard arm 152 may further include an alignment aperture 155 to receive a fastener 170. Referring again to FIG. 4, the outboard arm 152 of the suspension bracket 150 may be spaced from suspension member 140 in the +x direction such that a space is left between the outboard side 142 of the suspension member 140 and the outboard arm 152 of the suspension bracket 150.

Figure 6:
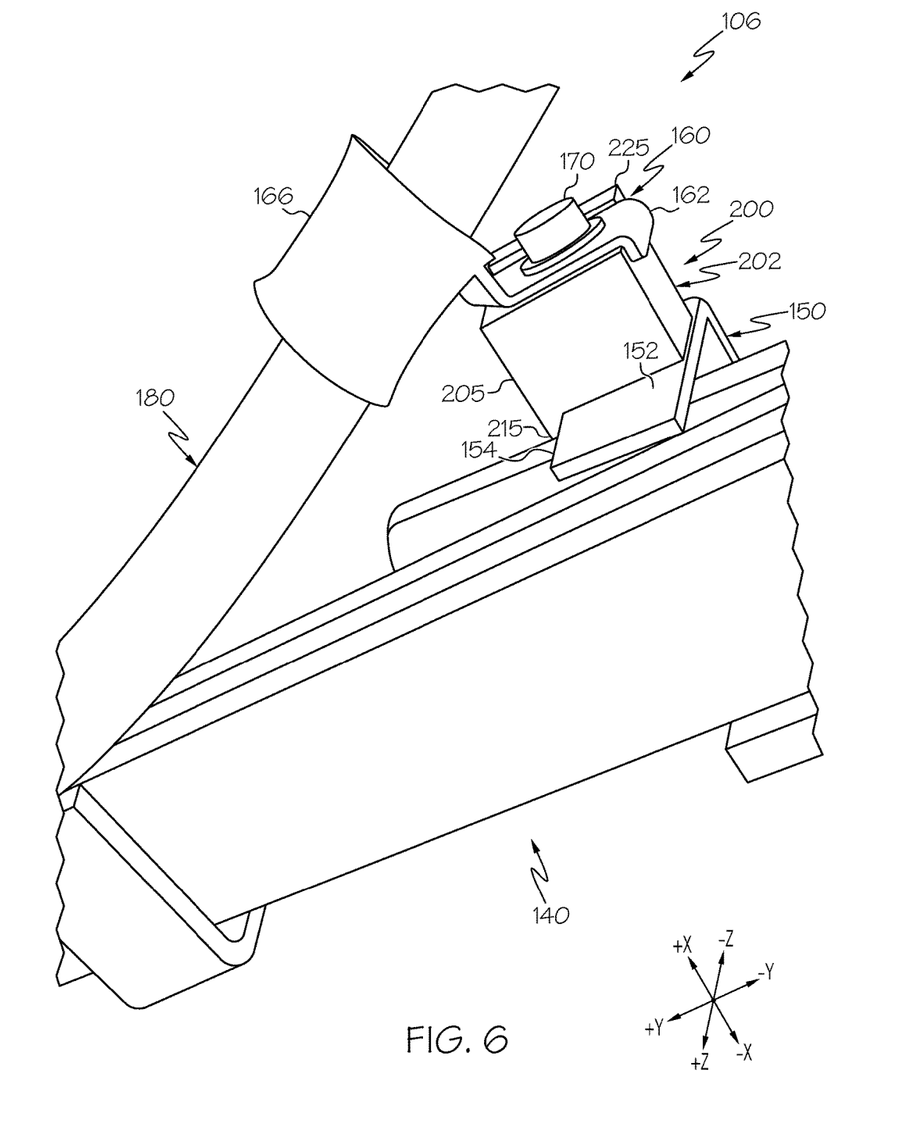
FIG. 6 depicts a top perspective view of the vehicle cable spacer of FIG. 5 coupled to the suspension member of the vehicle of FIG. 1 according to one or more embodiments shown and described herein.

Referring to FIGS. 5 and 6, a vehicle cable spacer 200 is coupled to the outboard arm 152 of the suspension bracket 150, such that the parking bracket spacer interfaces with both the outboard surface 153 and the edge 154 of the suspension bracket 150.

Figure 7:
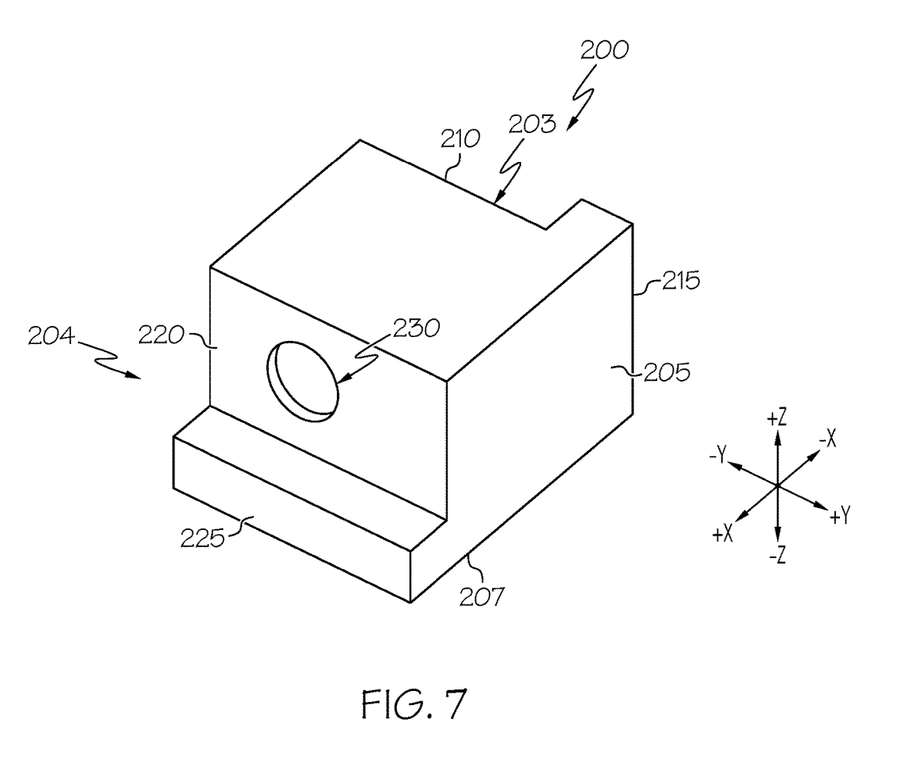
FIG. 7 depicts a top perspective view of the vehicle cable spacer of FIGS the 5 and 6 unattached to any other structure according to one or more embodiments shown and described herein.

Referring now to FIG. 7, the vehicle cable spacer 200 includes a body 202, a first face 210 at a inboard end 203 of the body 202, and a second face 220 at an outboard end 204 of the body 202 that is spaced apart from the first face 210 by a width of the body 202. The body 202 may define first and second planes 205, 207 extending substantially perpendicularly to one another. A first anti-rotation tab 215 may extend substantially perpendicularly from the first face 210. A second anti-rotation tab 225 may extend substantially perpendicularly from the second face 220.

In at least some embodiments, the first and second planes 205, 207 are continuous with the body 202, such that the body 202 has a constant cross section between the first and second faces 210, 220. In yet other embodiments, the cross section of the body 202 may vary between the first and second faces 210, 220. Furthermore, the first and second faces 210, 220 may be substantially parallel to one another.

The first anti-rotation tab 215 may extend from the first face 210 in a direction of the first plane 205 at a position adjacent to the first plane 205. The first anti-rotation tab 215 may extend along an entire height of first face 210 or only a portion thereof. In some embodiments, the first anti-rotation tab 215 may be divided into a plurality of anti-rotation tabs distributed along the first face 210 at a position adjacent to the first plane 205.

The second anti-rotation tab 225 may extend from the second face 220 in a direction of the second plane 207 at a position adjacent to the second plane 207 and is offset from the position of the first anti-rotation tab 215. The second anti-rotation tab 225 may extend along an entire width of second face 220 or only a portion thereof. In some embodiments, the second anti-rotation tab 225 may be divided into a plurality of anti-rotation tabs distributed along the width the second face 220. As such, the first and second anti-rotation tabs 215, 225 may extend in substantially opposite directions and may be substantially perpendicular to one another.

In some embodiments, the first and second anti-rotation tabs 215, 225 may be substantially equal in size. In other embodiments, the first and second anti-rotation tabs 215, 225 may be substantially different in size and orientation. For example, and not as a limitation, the first anti-rotation tab 215 may include multiple anti-rotation tabs extending from the first face 210, whereas the second anti-rotation tab 225 is a singular anti-rotation tab extending from the second face 220.

The vehicle cable spacer 200 may further include a fastener receiving aperture 230 extending at least through one of the first face 210 or the second face 220 of the vehicle cable spacer 200. Referring to FIG. 4, the fastener receiving aperture 230 is configured to align with an alignment aperture 155 of the suspension bracket 150Chrs, such that the first anti-rotation tab 215 is aligned with the edge 154 of the suspension bracket 150 (see FIGS. 5 and 6). In this embodiment, a fastener 170 is inserted through both the outboard arm 152 of the suspension bracket 150 and the first face 210 of the vehicle cable spacer 200 to rigidly couple the vehicle cable spacer 200 to the suspension bracket 150. In other embodiments, the vehicle cable spacer 200 may instead be rigidly fixed to the suspension bracket 150 through any suitable process including, but not limited to, welding or bonding.

Referring now to FIG. 5, the second face 220 of the vehicle cable spacer 200 may also have a fastener receiving aperture 230 extending therethrough. The second face 220 and the second anti-rotation tab 225 of the vehicle cable spacer 200 are configured to receive the cable cuff 160 as will be explained in more detail herein. The fastener 170 may be inserted through the cable cuff 160 and into the fastener receiving aperture 230 of the vehicle cable spacer 200 to rigidly couple the vehicle cable spacer 200 to the cable cuff 160. The cable cuff 160 will interface with the second anti-rotation tab 225 such that the cable cuff 160 is prevented from rotating around the fastener receiving aperture 230 of the second face 220 (see also FIG. 6). In other embodiments, the cable cuff 160 may instead be rigidly fixed to the vehicle cable spacer 200 through any suitable process including, but not limited to, welding or bonding.

In at least one embodiment, and as illustrated in FIG. 5, the fastener receiving aperture 230 may extend through the body 202 of the vehicle cable spacer 200 from the first face 210 to the second face 220. In such embodiments, a single fastener 170 may be passed through the suspension bracket 150, the vehicle cable spacer 200, and the cable cuff 160 to couple the suspension bracket 150, the vehicle cable spacer 200, and the cable cuff 160 in a rigid, non-rotatable configuration (see also FIG. 6).

The vehicle cable spacer 200 may be made out of a variety of materials. One non-limiting example includes aluminum. In some embodiments, the vehicle cable spacer 200 may be black anodized aluminum.

Still referring to FIG. 5, the cable cuff 160 includes an extending portion 162 having an edge 164. The extending portion 162 is configured to interface with the second face 220 and extend therefrom to a cuff portion 166. The edge 164 of the extending portion 162 is configured to engage the second anti-rotation tab 225. In some embodiments, the extending portion 162 is configured to receive a fastener 170 there through to couple the extending portion 162 to the second face 220 of the vehicle cable spacer 200, wherein the edge 164 of the extending portion 162 of the cable cuff 160 engages the second anti-rotation tab 225 such that the cable cuff 160 is substantially prevented from rotating about the vehicle cable spacer 200.

Referring now to FIG. 6, the cuff portion 166 of the cable cuff 160 may form a complete or partial loop. The cuff portion 166 is configured to have a vehicle cable 180 pass therethrough. In some embodiments, the vehicle cable 180 is a parking brake cable. The cuff portion 166 may engage the vehicle cable 180 in a sliding engagement or a frictional engagement to inhibit sliding of the vehicle cable 180 relative to the cable cuff 160. When attached to the vehicle cable spacer 200, the cable cuff 160 extends in a substantially outboard direction relative to the second face 220 of the vehicle cable spacer 200 (see also FIG. 4).

Referring again to FIG. 4, when the vehicle cable spacer 200 is coupled to the suspension bracket 150, and the cable cuff 160 is coupled to the second face 220 of the vehicle cable spacer 200, the vehicle cable 180 may be routed through the cuff portion 166 of the cable cuff 160 to space the vehicle cable 180 outboard of or otherwise away from the vehicle cable spacer 200, and thus, outboard of the shock absorbing system 130.

A method of routing the vehicle cable 180 away from the shock absorbing system 130 of the vehicle 100 will now be described in more detail.

To route the vehicle cable 180 away from shock absorbing system 130, the vehicle cable spacer 200 is attached to the suspension bracket 150. To do so, the first face 210 is directed toward the outboard arm 152 of the suspension bracket 150. The first anti-rotation tab 215 is aligned with the edge 154 of the outboard arm 152 of the suspension bracket 150. In embodiments wherein the suspension bracket 150 has an alignment aperture 155 as described herein, the fastener receiving aperture 230 of the first face 210 is aligned with the alignment aperture 155 of the suspension bracket 150. A fastener 170 may be passed through the alignment aperture 155 of the outboard arm 152 of the suspension bracket 150 and at least the first face 210 of the vehicle cable spacer 200 to couple the vehicle cable spacer 200 to the outboard arm 152 of the suspension bracket 150 in a non-rotatable configured. As described above, there may be other suitable processes to attach the vehicle cable spacer 200 to the suspension bracket 150 including but not limited to welding or bonding.

Referring primarily to FIG. 5, the cable cuff 160 is attached to the second face 220 of the suspension bracket 150. To do so, the extending portion 162 of the cable cuff 160 is aligned with the second face 220 of the vehicle cable spacer 200. The edge 164 of the extending portion 162 interfaces with the second anti-rotation tab 225. A fastener 170 may then be passed through the cable cuff 160 and the suspension bracket 150 to couple the cable cuff 160 to the suspension bracket 150. In some embodiments, a single fastener 170 passes through the cable cuff 160, the vehicle cable spacer 200, and the suspension bracket 150 to couple the cable cuff 160, the vehicle cable spacer 200, and the suspension bracket 150 in a rigid non-rotatable configuration. It is noted that in further embodiments, the cable cuff 160 may be integrally formed with the vehicle cable spacer 200 such that no secondary anti-rotation tab is needed. In that case, the first anti-rotation tab 215 would be adequate to prevent the vehicle cable spacer 200 and/or the cable cuff 160 from rotating toward the shock absorbing system 130 or components thereof.

Referring again to FIG. 4, when coupled to the vehicle cable spacer 200, the cuff portion 166 of the cable cuff 160 extends away from the second face 220 of the vehicle cable spacer 200 in the outboard direction at least partially beyond a portion of the shock absorbing system 130. The vehicle cable 180 is routed through the cuff portion 166 of the cable cuff 160. As such, the vehicle cable 180 is pushed in the outboard direction.

The outboard positioning of the vehicle cable 180 relative to the vehicle cable spacer 200 forces the vehicle cable 180 to be routed outboard and away from the shock absorbing system 130. As such contact between the components of the shock absorbing system 130 and the vehicle cable 180 is substantially limited. Thus, the shock absorbing system 130 is substantially protected from damage that may otherwise be caused by the vehicle cable 180 contacting components of the shock absorbing system 130.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising
a suspension member engaged with an axle of the vehicle, the suspension member having an outboard side;
a suspension bracket, fixed to the suspension member, and having an outboard arm;
a vehicle cable spacer coupled to the outboard arm of the suspension bracket and comprising:
a body;
a first face, directed toward the suspension bracket;
a first anti-rotation tab extending inboard from the first face and engaging an edge of the suspension bracket;
a second face spaced apart from the first face by a width of the body; and
a second anti-rotation tab extending outboard from the second face;
a cable cuff coupled to the second face of the vehicle cable spacer, an edge of the cable cuff engaging the second anti-rotation tab of the vehicle cable spacer; and
a vehicle cable extending through the cable cuff such that the vehicle cable is spaced from the vehicle cable spacer.

2. The vehicle of claim 1, wherein the vehicle further comprises a shock absorbing system comprising a shock absorber and a fluid reservoir fluidly coupled to the shock absorber, the shock absorbing system being coupled to the axle of the vehicle.

3. The vehicle of claim 2, wherein the vehicle cable is spaced from the shock absorbing system by the vehicle cable spacer.

4. The vehicle of claim 1, wherein the vehicle cable spacer further comprises a fastener receiving aperture extending through at least the first face.

5. The vehicle of claim 4, wherein the suspension bracket further comprises an alignment aperture, wherein the fastener receiving aperture of the vehicle cable spacer aligns with the alignment aperture of the suspension bracket such that a fastener passes through both the fastener receiving aperture of the vehicle cable spacer and the alignment aperture of the suspension bracket to fix the vehicle cable spacer to the suspension bracket.

6. The vehicle of claim 4, wherein the fastener receiving aperture extends from the first face, through the body of the vehicle cable spacer, to the second face.

7. The vehicle of claim 6, wherein the cable cuff comprises an extending portion and a cuff portion, wherein the extending portion comprises an edge engaged to the second anti-rotation tab of the vehicle cable spacer and is configured to receive a fastener therethrough, such that a single fastener traverses the extending portion of the cable cuff, the fastener receiving aperture of the vehicle cable spacer, and an alignment aperture of the suspension bracket to couple the cable cuff and the vehicle cable spacer to the suspension bracket in a non-rotatable configuration.

8. The vehicle of claim 1, wherein the first anti-rotation tab extends substantially perpendicularly from the first face.

9. The vehicle of claim 1, wherein:
the first anti-rotation tab extends substantially perpendicularly from the first face in a direction of a first plane; and
the second anti-rotation tab extends substantially perpendicularly from the second face in a direction of a second plane, wherein the first anti-rotation tab and the second anti-rotation tab extend in substantially opposite directions and the first and second planes are substantially perpendicular to one another.

10. The vehicle of claim 1, wherein the cable cuff comprises an extending portion and a cuff portion, wherein the extending portion has an edge engaged with the second anti-rotation tab of the vehicle cable spacer.

11. The vehicle of claim 1, wherein the suspension bracket is coupled to the suspension member along an underside portion of the suspension bracket and wherein the outboard arm of the suspension bracket is spaced from the suspension member.

12. The vehicle of claim 1, wherein the suspension member is a leaf spring.

13. A method of routing a vehicle cable of a vehicle away from an undercarriage component of the vehicle comprising:
attaching a vehicle cable spacer to a suspension bracket of the vehicle, the suspension bracket being attached to a suspension member of the vehicle and comprising an outboard arm spaced apart from the suspension member; the vehicle cable spacer comprising:
a body;
a first face, directed toward the suspension bracket;
a first anti-rotation tab extending inboard from the first face, wherein the first anti-rotation tab of the vehicle cable spacer is aligned with an edge of suspension bracket;
a second face spaced apart from the first face by a width of the body; and
a second anti-rotation tab extending outboard from the second face;
attaching a cable cuff to the second face of the vehicle cable spacer, the cable cuff comprising an extending portion and a cuff portion, wherein the extending portion is aligned with the second anti-rotation tab of the vehicle cable spacer; and
routing a vehicle cable of the vehicle through the cuff portion of the cable cuff, such that the vehicle cable is spaced from the vehicle cable spacer.

14. The method of claim 13, wherein:
the first anti-rotation tab extends substantially perpendicularly from the first face in a direction of a first plane; and
the second anti-rotation tab extends substantially perpendicularly from the second face in a direction of a second plane, wherein the first anti-rotation tab and the second anti-rotation tab extend in substantially opposite directions and the first and second planes are substantially perpendicular to one another.

15. The method of claim 13 further comprising:
passing a fastener through the first face of the vehicle cable spacer and the suspension bracket to rigidly fix the vehicle cable spacer to the suspension bracket in a non-rotatable configuration; and
passing a fastener through the extending portion of the cable cuff and the second face of the vehicle cable spacer to rigidly fix the cable cuff to the vehicle cable spacer in a non-rotatable configuration.

16. The method of claim 13 further comprising passing a single fastener through the extending portion of the cable cuff, the second face of the vehicle cable spacer, the body of the vehicle cable spacer, the first face of the vehicle cable spacer, and the suspension bracket to rigidly fix the cable cuff and the vehicle cable spacer to the suspension bracket in a non-rotatable configuration.

17. A vehicle cable spacer comprising:
a body;
a first face at an inboard end of the body;
a first anti-rotation tab extending substantially perpendicularly from the first face in a direction of a first plane;
a second face spaced apart from the first face by a width of the body; and
a second anti-rotation tab extending substantially perpendicularly from the second face in a direction of a second plane, wherein the first anti-rotation tab and the second anti-rotation tab extend in substantially opposite directions and the first and second planes are substantially perpendicular to one another;
a fastener receiving aperture extending at least through the first face, wherein the fastener receiving aperture is configured to align with an alignment aperture of a suspension bracket of a vehicle and the first anti-rotation tab is configured to align with an edge of the suspension bracket;
wherein the second face is configured to receive a cable cuff, the cable cuff comprising an extending portion and a cuff portion, wherein the extending portion engages the second anti-rotation tab of the vehicle cable spacer.

18. The vehicle cable spacer of claim 17, wherein the fastener receiving aperture extends through the first face, the body, and the second face.

19. The vehicle cable spacer of claim 17, wherein the first anti-rotation tab extends along an entire height of the first face.

20. The vehicle cable spacer of claim 17, wherein the second anti-rotation tab extends along an entire width of the second face.

* * * * *